US006289032B1

(12) United States Patent
Fay et al.

(10) Patent No.: US 6,289,032 B1
(45) Date of Patent: Sep. 11, 2001

(54) SELF-COLLIMATING MULTIWAVELENGTH LASERS

(75) Inventors: Martin F. Fay, Toronto; Jingming Xu, Oakville, both of (CA)

(73) Assignees: Governing Council of the University of Toronto; Martin Freestone Fay, both of Toronto; Jing Ming Xu, Oakville, all of (CA)

( * ) Notice: Subject to any disclaimer, the term of this patent is extended or adjusted under 35 U.S.C. 154(b) by 0 days.

(21) Appl. No.: 09/292,663

(22) Filed: Apr. 16, 1999

Related U.S. Application Data

(60) Provisional application No. 60/081,964, filed on Apr. 16, 1998.

(51) Int. Cl.[7] .................................................. H01S 3/08
(52) U.S. Cl. ................................ 372/102; 372/20; 372/92
(58) Field of Search .............................. 372/102, 20, 64, 372/92

(56) References Cited

U.S. PATENT DOCUMENTS 4,505,582 * 3/1985 Zuleeg et al. ........................... 372/28

OTHER PUBLICATIONS

A. Hardy et al., "Design Considerations of Large Aperture Perpendicular Gratings Semiconductor Ring Lasers", American Institute of Physics, Appl. Phys. Lett. 62(9), Mar. 1, 1993, pp. 931.

K.M. Dzurko, "1–W Single–Mode Edge–Emitting DBR Ring Oscillators", IEEE Photonics Technology Letters, vol. 4, No. 4, Apr. 1993, pp. 369–371.

V.A., Sychugov et al., "Nonlocalized Bragg Mirror of the Corner–Reflector Type", American Institute of Physics, Sov. Tech. Phys. Lett. 5(10), Oct. 1979, pp. 533–534.

K.M. Dzurko, "Single Mode Broad Area Distributed Bragg Reflector Ring Oscillators", American Institute of Physics, Appl. Phys. Lett. 61(20), Nov. 16, 1992, pp. 2389–2391.

K.M. Dzurko, "Distributed Bragg Reflector Ring Oscillators", (Sponsored by U.S. Air Force, Phillips, Laboratory, Pilot Program) Spectra Diode Labs, pp. 513–514.

K.M. Dzurko, "500 mW Coherent Large Aperture Ring Oscillators", Electronic Letters, vol. 28, No. 16, Jul. 30, 1992, pp. 1477–1478.

K.M. Dzurko, "Distributed Bragg Reflector Ring Oscillators: A Large Aperture Source of High Single–Mode Optical Power", IEEE Journal of Quantum Electronics, vol. 29, No. 6, Jun. 1993, pp. 1895–1905.

Sychugov et al; Nonlocalized Bragg mirror of the corner–reflector type; Sov. Tech. Phys. Lett. 5(10), Oct. 1979, pp533–534.*

* cited by examiner

Primary Examiner—Leon Scott, Jr.
(74) Attorney, Agent, or Firm—Lynn Schumacher; Hill & Schumacher

(57) ABSTRACT

The present invention provides self-collimating multiwavelength lasers (MWL) including a planar gain medium with a resonance cavity defined by superimposed gratings. These laser devices are characterized by lasing wavelengths with multiple peaks in their reflectance spectra defined by the superimposed gratings. The gratings also limit beam divergence, producing self-collimated multiwavelength output, with the potential for high power. These devices can be implemented in any planar gain medium in which multi-peak gratings can be produced, including but not limited to semiconductors and doped glasses. The self-collimated MWL's disclosed herein have applications in areas such as DWDM (dense wavelength division multiplexing) communications systems, free-space uses such as interconnects, range-finding, and inter-satellite infrared communication. In one aspect the device is a multiwavelength ring cavity laser including a planar gain medium with two orthogonal pairs of supergratings (SG) A and B, which emulate the superposition of M and N single-pitch gratings respectively. SG-A has a set of M diffraction wavelengths that depends on the incident angle $\theta$; a similar dependence on $\phi=\theta-90°$ exists for the set of N diffraction wavelengths of SG-B. Wavelength-angle pairs common to both SG-A and SG-B will be resonant within the cavity as a whole. When combined with optical gain, the result is lasing at M by N wavelengths, collimated at a well-defined output angle.

26 Claims, 7 Drawing Sheets

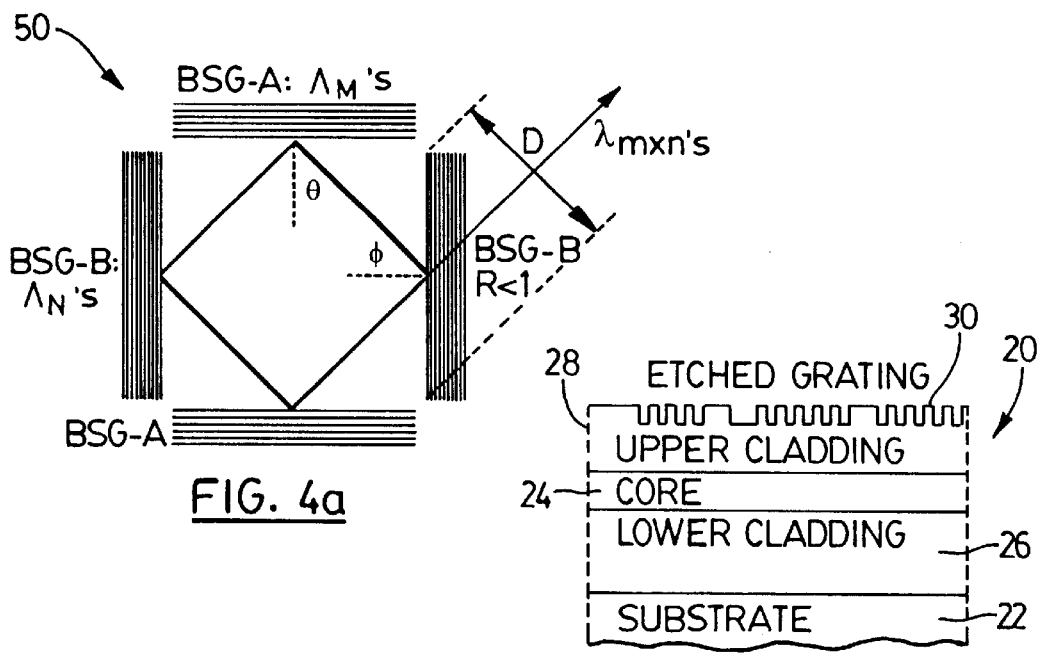
FIG. 4a
FIG. 3
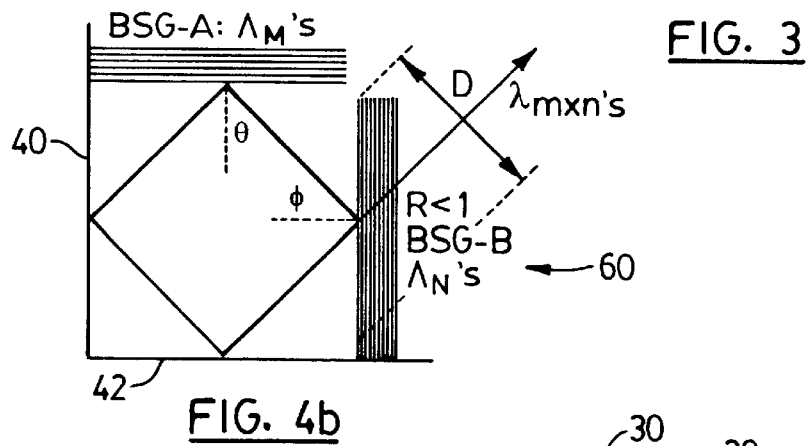
FIG. 4b
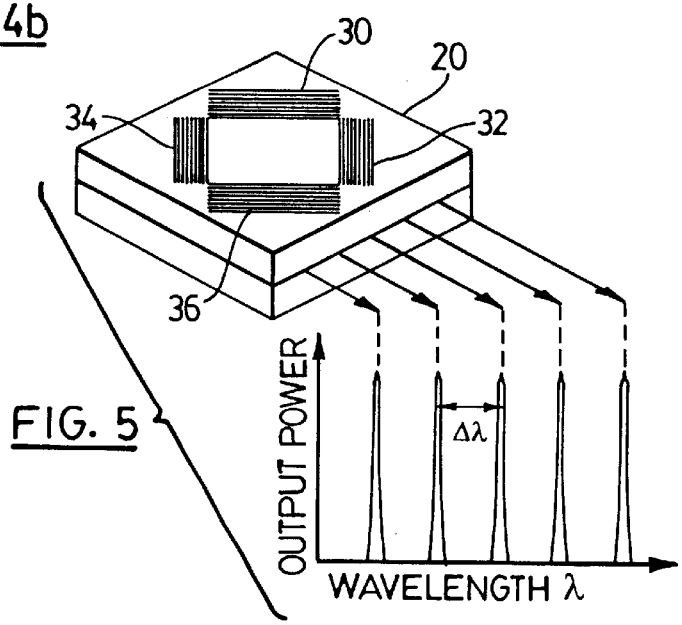
FIG. 5

SELF-COLLIMATING MULTIWAVELENGTH LASERS

CROSS REFERENCE TO RELATED U.S. PATENT APPLICATION

This application relates to U.S. Provisional patent application, Ser. No. 60/081,964, filed on Apr. 16, 1998, entitled MULTIWAVELENGTH SELF-COLLIMATING LASERS.

FIELD OF THE INVENTION

The present Invention relates generally to multiwavelength lasers and more particularly to self-collimating multiwavelength lasers constructed using superimposed gratings.

BACKGROUND OF THE INVENTION

Multiwavelength lasers (MWLs) have great potential in a variety of civilian and military applications, enabling the increased transmission rates of wavelength-division multiplexing (WDM) systems, and enhanced operation in free-space settings such as range-finding and beam guidance. Ideally, MWLs should have low inter-channel interference (crosstalk), high power, low beam divergence for optimum coupling or free-space propagation, and be compact. In addition, it is highly desirable that any associated tuning circuitry be as simple as possible for ease of packaging and control, and that device size and complexity scale well as the number of wavelengths increases. No existing MWL design achieves all these ideals. This is due in part to gaps in the understanding of gain cavity behaviour under multiwavelength lasing conditions, but also to limitations inherent in established laser designs.

A number of MWL schemes have been developed, and generally fall in two categories: array and shared-gain. Array MWLs consist of a row of single-wavelength laser (SWL) designs, along which some wavelength-selecting parameter is varied. They offer the advantages of being a relatively simple extension of SWLs, and allow straightforward individual modulation of each laser. However, such devices are prone to cross-talk from independent drifting of individual wavelengths; subject to channel deviations from fabrication imprecision; and suffer from low yield. For shared-gain MWLs, channels share a gain region integrated with multi-resonance feedback elements, yielding a wavelength comb whose spacing is maintained even in the event of overall drifting. However, gain-coupling cross-talk must be properly treated when the wavelength spacings are too small (<1 nm), and individual channel modulation can be more difficult. The performance characteristics of current MWL designs are summarized below in Table 1.

As can be seen, impressive individual characteristics have been achieved. However, no single device combines the virtues of high power, large channel density, and low divergence. In fact, all designs suffer from high divergence: near-field beam size is no more than a few $\mu$m, which (for $\lambda \sim 1$ $\mu$m) corresponds to a divergence of at least $\sim 10°$. The ideals of high power and low divergence are in contradiction due to the requirement of monomode operation, which for existing MWLs restricts both current density and beam width.

The ideals of low divergence and high-power have been realized concurrently at a single wavelength in a ring laser configuration as disclosed in V. A. Sychugov, A. V. Tishchenko, A. A. Khakimov, "Nonlocalized Bragg Mirror Of The Comer-Reflector Type", Soviet Technical Physics Letters, 5 1270–1274, 1979., and refined by K. M. Dzurko et al, see K. M. Dzurko, D. R. Scifres, A. Hardy, D. F. Welch, R. G. Waarts, and S. O'Brien, "500 mW coherent large aperture ring oscillators", Electronics Letters, 28 1477–1478, 1992. In both implementations, conventional single-pitch gratings were empilayed, and output was single-wavelength only.

To overcome the aforementioned shortcomings, there is a need for a lasers which simultaneously permit broad-beam collimation and monomode operation, with simultaneous emission of multiple wavelengths

SUMMARY OF THE INVENTION

It is an object of the present Invention to provide self-collimating multiwavelength laser.

It is also an object of the present invention to provide self-collimating laser whose output wavelength can be tuned quasi-continuously over a broad range.

In one aspect of the invention there is provided a self-collimating multiwavelength laser, comprising:

a gain medium:

at least two superimposed gratings formed in the gain medium, the at least two superimposed gratings being oriented at an effective angle to each other to define a resonance cavity; and means for pumping the gain medium to produce a population inversion in the gain medium.

In this aspect of the invention the gain medium may be a substantially planar gain medium and the superimposed gratings may be binary superimposed gratings. The binary superimposed gratings include an integral number of single-pitch gratings.

In another aspect of the invention there is provided a tunable lasers comprising a gain medium; at least two superimposed gratings formed in the gain medium, the at least two superimposed gratings being oriented at an effective angle to each other to define a resonance cavity;, tuning means for independently tuning each of said at least two superimposed gratings to independently adjust an effective refractive index of each of said at least two superimposed grating thereby shifting diffraction spectra of the superimposed gratings for tuning of a resonant wavelength in said resonance cavity; and means for pumping the gain medium to produce a population inversion in the gain medium.

In this aspect of the invention the gain medium may be a substantially planar gain medium and the superimposed gratings may be binary superimposed gratings.

The present invention also provides a method of producing a self-collimating multiwavelength laser. The method comprises providing a gain medium and producing therein at least two superimposed gratings. The at least two superimposed gratings are oriented at an effective angle to each other to define a resonance cavity. The method includes pumping the gain medium to produce a population inversion in said gain medium.

In another aspect of the invention there is provided a imethod of tuning a self-collimated laser. The method comprises providing a gain medium and producing therein at least two superimposed gratings. The at least two superimposed gratings are oriented at an effective angle $\theta$ to each other to define a resonance cavity. A first of the two superimposed gratings emulates a superposition of the set of pitches $\Lambda_A$ and has an effective refractive index in a region of said first grating of $(n_{eff})_A$. The second superimposed grating emulates the set of pitches $\Lambda_B$, and has an effective refractive index in a region of the second grating of $(n_{eff})_B$. A set of wavelengths diffracted by the first grating is $\lambda_A 2(n_{eff})_A \Lambda_A$ and a set of wavelengths diffracted by the second grating is $\lambda_B=2(n_{eff})_B \Lambda_B \sin(\theta)$. The method includes adjusting an effective refractive index of at least one of the superimposed gratings to achieve a resonance condition in which $\lambda_A=\lambda_B$. The method includes pumping the gain medium to produce a population inversion in the gain medium.

BRIEF DESCRIPTION OF THE DRAWINGS

The following is a description, by way of example only, of self-collimating multiwavelength laser devices constructed in accordance with the present invention, reference being had to the accompanying drawings in which:

FIG. 3 is a cross-sectional side elevation of a portion of an etched grating for implementing a resonance cavity in a planar waveguide;

FIG. 4(a) is a diagrammatic representation of a multi-wavelength ring laser with a two matching pairs of binary superimposed gratings to give a square resonance cavity producing a laser output comprising M×N wavelengths;

FIG. 4(b) is a diagrammatic representation of a multi-wavelength ring laser with two binary superimposed gratings perpendicular to each other and two reflective facets to give a rectangular resonance cavity producing a laser output comprising M×N wavelengths;

FIG. 5 illustrates a self-collimating MWL device with multiple wavelength outputs;

DETAILED DESCRIPTION OF THE INVENTION

Figure 1:
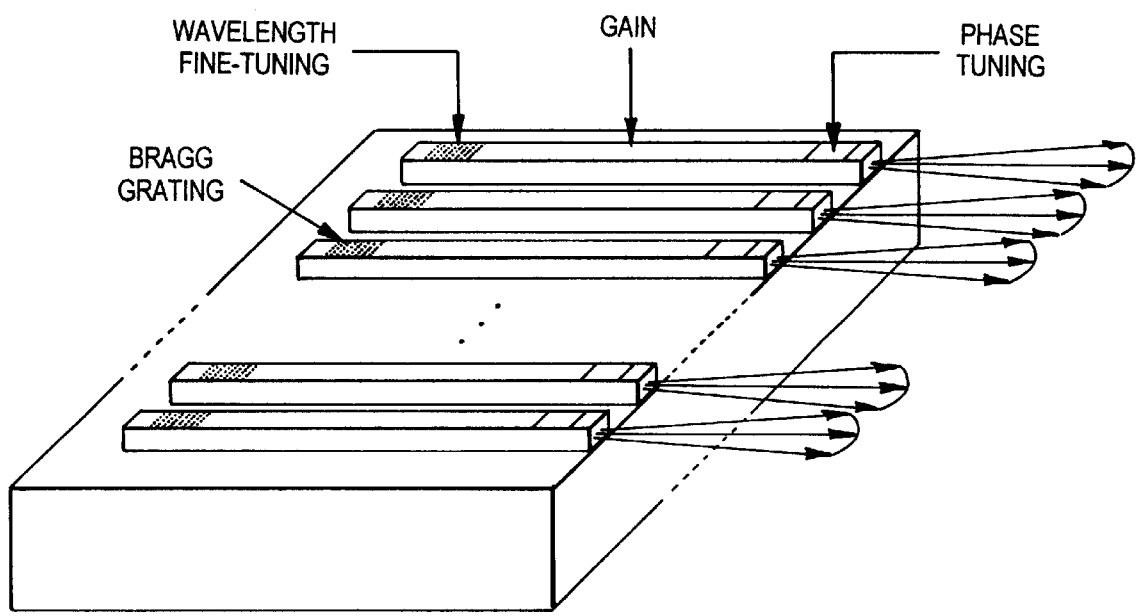
FIG. 1 is a schematic drawing of a prior art distributed feedback (DFB) laser array scheme.

FIG. 1 is a schematic drawing of a prior art distributed feedback (DFB) laser array scheme. When pumped with gain current, each ridge lases at a single wavelength determined by its Bragg grating. Current to the grating region allows fine tuning of wavelength, and phase tuning is required to ensure cavity resonance at the selected value. In all, three control signals Eire required for each laser. These devices are also characterized by a highly divergent output beam.

The self-collimating multiwavelength lasers (MWL) disclosed herein exploit the increased degrees of freedom afforded by planar propagation (as opposed to the quasi-1D nature of existing MWLs), by making) use of superimposed gratings (SGs), which can be implemented in a planar waveguide to define a two-dimensional resonant cavity. Multiple binary superimposed Bragg gratings are the most preferred gratings for constructing the lasers. When combined with gain, this leads to simultaneous multi-wavelength lasing, where the gratings define not only peak wavelengths but beam divergence, leading to the attractive properties of self-maintained wavelength spacing (i.e. no drift-induced cross-talk) and self-collimation. High-power operation is also facilitated by the relatively low carrier densities involved.

The basic building block of the self-collimating multi-wavelength lasers (MWL) disclosed herein is the binary supergrating (BSG, also known as a "binary superimposed grating"), which was originally conceived to address etching constraints In semiconductor integrated optics. The BSG is a wavelength-selective device similar in operation to the Bragg grating, but with near arbitrary reflection characteristics utilizing a convenient two-level (binary) implementation. The BSG can be described as a sequence of equal-width lines whose effective index is one of two values. The selection of these values, which can be represented as a binary sequence of 1's and 0's, lies at the heart of BSG synthesis. This concept can be applied to any waveguide structure, independent of the material.

Advantageously, the etched grating implementations for the binary superimposed grating (BSG), permits one to select arbitrarily adjustable diffraction characteristics—in the present invention those of a superposition of multiple co-located Bragg gratings—while remaining compatible with standard electron-beam lithography and single-depth etching processes. The present invention uses BSGs in implementing self-collimated multi-wavelength devices in materials where gratings must be etched (i.e. semiconductors), although, as will be known to those skilled in the art, there are several methods that may be used for grating creation in the gain medium.

Figure 2:
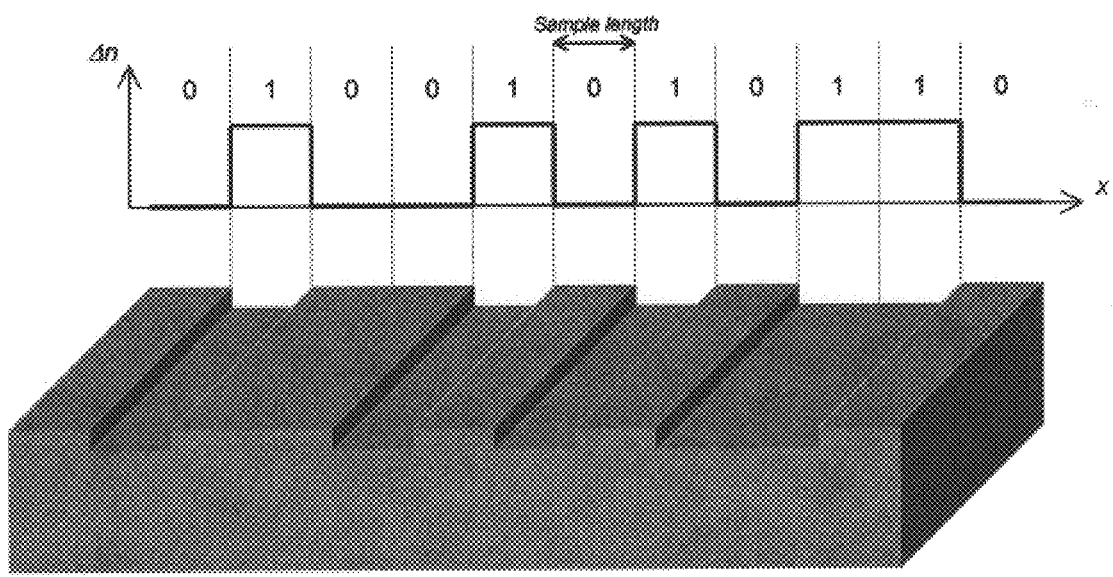
FIG. 2 shows a BSG index profile and surface relief implementation.

Referring to FIG. 2, there are two main properties that define the binary superposed grating in relation to other grating technologies. The first is that the BSG relies on a discrete number of refractive index levels. This number is historically 2 and hence the BSG is known as a binary grating. Many of the advantages of the BSG, however, are maintained when multiple levels of refractive index are used, and most of the theory and methods presented here still apply. The second defining trait of the BSG is that it is a sampled strcture characterized by a sample length. This refers to the fact that transitions between the grating's index levels cannot occur at arbitrary positions, but must rather occur at multiples of the sample length. The BSG thus seems strikingly similar in definition to the familiar notion of a digital signal—a discrete sampled waveform. Viewed as such, the BSG can be described by a series of (often binary) digits, indicating the refractive index setting at each sample point. Thus binary superimposed gratings (BSGs) consist of an array of equal-sized elements, each of which is either etched to a fixed depth, or not etched at all, see Ivan A. Avrutsky, Dave Ellis, Alex Tager, Hanan Anis, and J. M. Xu, "Design Of Widely-Tunable Semiconductor Lasers And The Concept Of Binary Superimposed Gratings (BSG)", IEEE J. Quantum Electron., 34 729–741 (1,398), and Ivan A. Avrutsky, Martin Fay, and J. M. Xu, "Multiwavelength Diffraction and Apodization using Binary Superimposed Gratings", IEEE Photon. Techn. Lett., Vol. 10, pp. 839–841 (1998). Effective modal index is thus constrained to one of two values, hence the term "binary" and the processing remains entirely compatible with established grating fabrication techniques. The pattern of etched lines can be tailored to produce near-arbitrary diffraction characteristics, allowing the emulation of multiple superimposed single-pitch gratings. BSGs are thus a natural choice for implementing self-collimated multi-wavelength lasers. In addition to offering greater design freedom, BSG's also exhibit greatly relaxed manufacturing tolerances compared with competing grating multi-wavelength reflectors. For example, the superstructure grating (SSG) requires ultra-fine variations In element width, whereas element width remains constant for the BSG. When compared with analog implementations of superimposed gratings, BSGs offer the additional advantage of immunity to process non-linearities.

The design of a BSG involves several considerations. One is selecting the set of refractive index levels, as determined from material parameters and lithographic or photoinscription constraints. For instance, gratings implemented by photoinscription in low-loss glass can attain a refractive index modulation of around $10^{-3}$. The natural choice of index values for a two-level grating is the intrinsic material index and the fully exposed level. In waveguide structures where the effective index of refraction is modulated by etching into the cladding layer, the index levels are determined by the available etch depth and the refractive index change that this etch will achieve.

Another design consideration is determining the desired sample length. The most important factors influencing this choice are the wavelength region for the grating's operation and the resolution of the lithographic or photoinscription process.

Another consideration is setting a total device length for the grating. The total length is restricted both by the physical space available for the device, and by the technological limitations of the inscribing process. For example, a grating implemented by means of electron beam lithography is usually limited in length to the size of single or multiple raster fields. This size is usually on the order of 500 $\mu$m, limiting the length of a BSG implemented by electron beam lithography to several millimeters at the very most. Of importance is choosing the refractive index pattern of the sample-length—sized segments that will produce the desired reflectance characteristics.

As used herein, the term "self-collimated" or "self-collimating" is defined as a beam of light emerging from any finite-sized aperture diverging at some angle $\theta_d$, which is fundamentally constrained to have a lower bound given by the diffraction limit: $\theta_d > 1.22 \lambda D$, where $\lambda$ is the wavelength of light in the beam, and D is the aperture diameter. A beam is said to be collimated when it is minimally convergent or divergent, which in practical terms can be several times the diffraction limit or more. The devices described in this application are said to be self-collimated because collimation occurs as a direct consequence of the resonance process itself; the superimposed gratings define riot only wavelength, but internal angle, thereby producing an output whose divergence can approach the diffraction limit.

The basic construction of these self-collimating multi-wavelength lasers relies upon a grating-defined resonance cavity, formed in a planar waveguide with optical gain. Referring to FIG. 3, a planar waveguide 20 comprises a substrate 22 with a planar core 24 sandwiched between a lower cladding 26 and an upper cladding 28 in which the BSG 30 is written. While the method and devices of the present invention are independent of the gain medium and of the method of grating creation, nevertheless two gain media are mentioned here to provide non-limiting examples. Firstly, in doped glass, superimposed gratings can be produced by iterative photoinscription or by etching, and optical gain can be achieved through optical pumping. In semiconductors, the, gratings can be etched, and gain achieved through either optical or electrical pumping. For each case, optical pumping can be achieved from the top or in-plane; and electrical pumping can provide gain to the whole cavity region (i.e. broad area) or to selected sub-regions for possible wavelength and mode-shape control.

FIG. 5 shows a self-collimated MWL constructed in a planar waveguide 20 with four sets of gratings 30, 32, 34 and 36 perpendicular to each other written into the upper cladding 28 with laser output beams at different wavelengths. The output wavelengths are represented by distinct arrows for illustrative purposes only, the beams will generally overlap substantially in practical implementations.

Figure 4C:
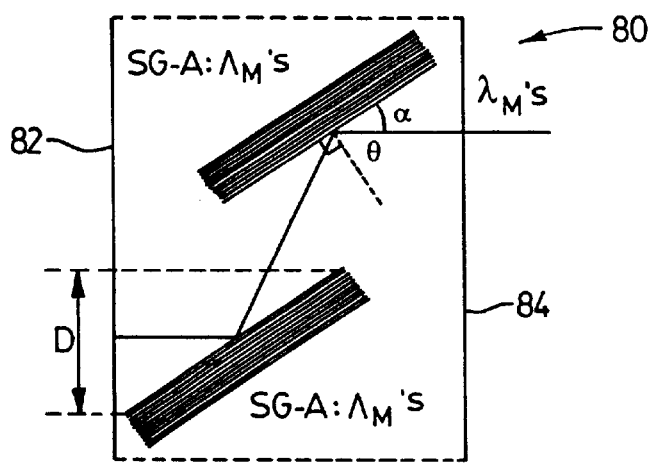
FIG. 4(c) is a diagrammatic representation of a multi-wavelength ring laser with a matching pair of angled binary superimposed gratings and two reflective facets producing a laser output comprising M wavelengths.

FIGS. 4(a), 4(b) and 4(c) show top-view representations of several embodiments of the self-collimating multiwavelength lasers. The indicated paths in FIGS. 4(a), 4(b) and 4(c) correspond to the peak of the beam, which fills most of the intergrating area. The rejective facets 40 and 42 in FIGS. 4(b) and 4(c) are indicated by solid lines. Grating zones A and B comprise supergratings (BSGs or otherwise) whose diffraction spectrum is equivalent to that of multiple sets of gratings. SG-A has a set of M diffraction wavelengths which depend on the incident angle $\theta$ according to:

$$\lambda_m(\theta) = 2 n_{eff} \Lambda_m \cos(\theta), \qquad [1]$$

where $\Lambda_m$ represents the grating pitches emulated by SG-A and $n_{eff}$ is the effective index.

The multiwavelength ring cavity laser 50, shown in FIG. 4(a), comprises a planar gain medium with two orthogonal pairs of supergratings (SG) A and B, which emulate the superposition of M and N single-pitch gratings respectively. SG-A has a set of M diffraction wavelengths which depend con the incident angle $\theta$; a similar dependence on $\phi=\theta-90°$ exists for the set of N diffraction wavelengths of SG-8. Wavelength-angle pairs common to both SG-A and SG-B will be resonant within the cavity as a whole. When combined with optical gain, the result is lasing at M by N wavelengths, collimated at a well-defined output angle. In respect of the allowed values of M and N, at least one of M, N $\geq 1$ and the other is >2. (M=1 is allowed provided N>1 and vise versa).

For the design of the self-collimating MWL 50 FIG. 4(a), reflection is achieved using two pairs of matched SGs, whereas for the laser 60 shown in FIG. 4(b), the required number of SGs is reduced to two through the use of internal reflection at two reflective facets 40 and 42. As used herein the term "facet" is defined as a reflecting interface. Preferably the facets are optically flat. The embodiment of FIG. 4(b) shows a resonance cavity formed by two effectively angled superimposed gratings and two effectively singled reflecting facets. Here, the gratings provide wavelength-selective reflection and the facets provide broad-band reflection, For most materials of practical interest (e.g.

doped glass or semiconductor), facet reflection efficiency will be high enough without a reflective coating. In fact, for semiconductors, practical configurations will yield total internal reflection at the facets.

For both designs, a dependence on $\phi=\theta-90°$ exists for the set of N diffraction wavelengths of SG-B:

$$\lambda_n(\theta)=2\, n_{eff}\Lambda_n \cos(\phi)=2\, n_{eff}\Lambda_n \sin(\theta) \quad [2]$$

Figure 8:
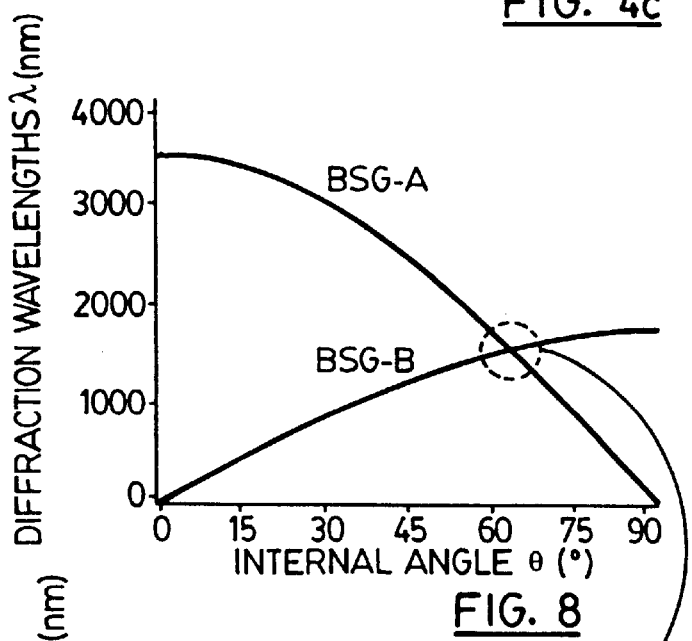
FIG. 8 shows a plot of diffraction wavelength versus internal angle for two supergratings A and B.
Figure 9:
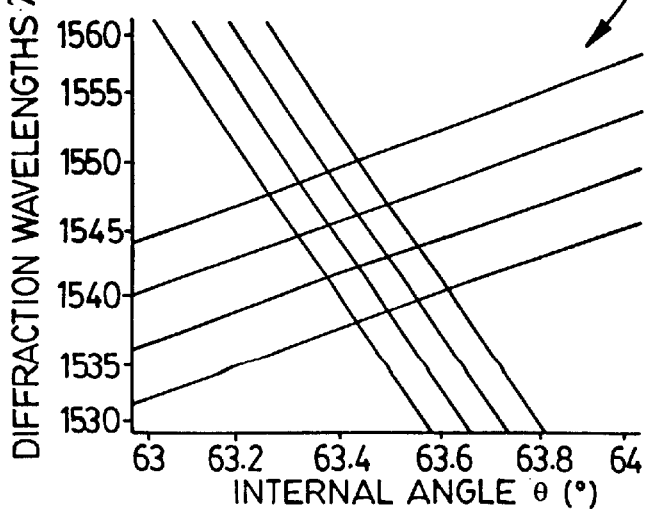
FIG. 9 is a detailed blow-up view of the circled section of FIG. 8.

The ring cavity design thus constrains both wavelength and internal angle to discrete values: lasing occurs at wavelengths and angles which simultaneously satisfy equations [1] and [2]. If these two equations are plotted simultaneously, resonance occurs where the corresponding curves intersect. This is demonstrated in FIG. 8, where the plot for equation [1] is labeled "BSG-A" and the plot for equation [2] is labeled "BSG-B". In general, these curves can multi-valued, leading to multiple intersections and hence multiple wavelength-angle pairs which will be resonant. Discerning these multiple resonances generally requires an expanded view of the intersection region, as shown in FIG. 9, where 16 intersections can clearly be seen. This quantity corresponds simply to the product of the number of distinct curves represented by BSG-A and that represented by BSG-B.

The self-collimating MW laser 50 of FIG. 4(a) was implemented by patterning BSGs in the upper cladding of an AlGaAs planar waveguide via electron-beam lithography followed by reactive ion etching. BSG-A emulated one or two pitches in the vicinity of 248 nm, whereas BSG-B emulated one or two in the vicinity of 175 nm. With the modal index $n_{eff}$ of 3.43, this yields expected peaks in the region of 980 nm, within the gain spectrum of 20% InGaAs quantum wells located in the core. Three combinations of M×N were employed: 1×1 (single peak) 1×2 (2 peaks spaced by 6 nm) shown at 70 in the inset of FIG. 6; and 2×2 (2 interlaced pairs of peaks spaced by 6 nm) shown at 70 in the inset of FIG. 6.

Figure 10A:
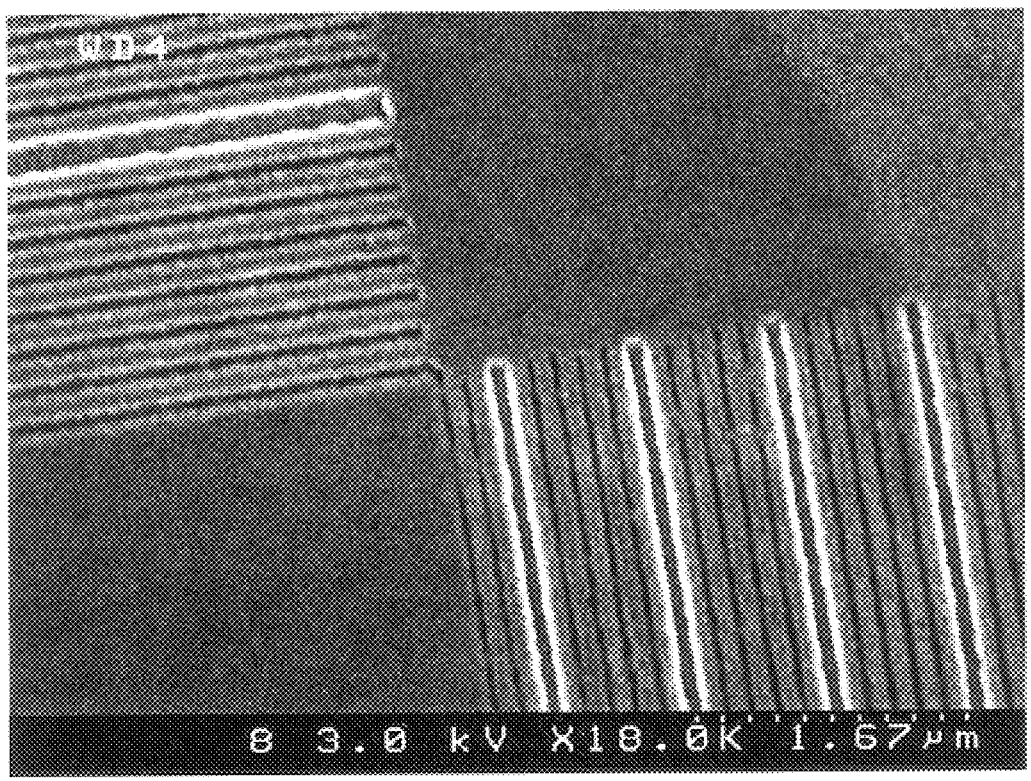
FIG. 10(a) is a top view scanning electron microscope (SEM) image of a grating for self-collimated multi-wavelength laser implemented in an AlGaAs planar waveguide showing relatively few defects.
Figure 10B:
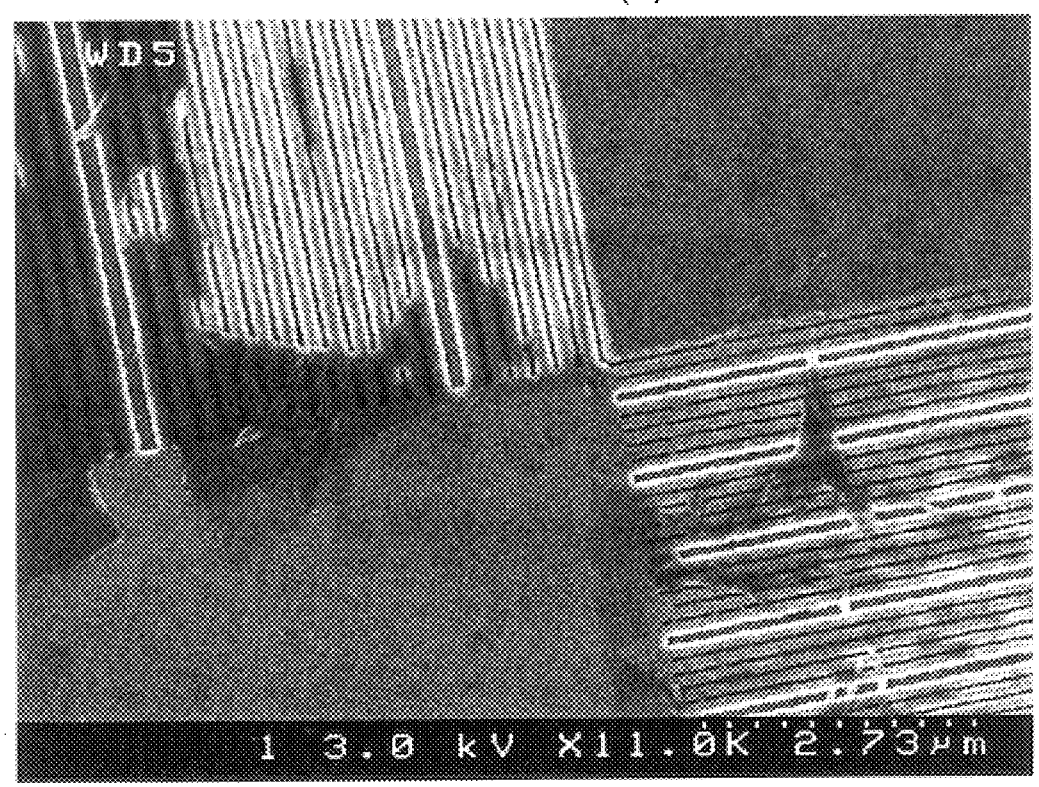
FIG. 10(b) is a top view scanning electron microscope (SEM) image of a grating for self-collimated multi-wavelength laser implemented in an AlGaAs planar waveguide similar to FIG. 10(a) showing several clearly evident defects, the SEM images for both FIGS. 10(a) and 10(b) were digitally stored and printed out.

Gratings were first tested with Raman-Nath scattering, which revealed excellent correspondence to the expected results with regards to both main peaks and spurious features. Devices were next verified under SEM to evaluate grating quality. As shown in FIGS. 10(a) and 10(b), the results were mixed: some devices were clean, whereas others exhibited obvious localized defects. What is remarkable, however, is that all devices exhibited comparable performance, giving a direct indication of BSG robustness.

The MWLs were then pumped at normal incidence using ~1 μs optical pulses with a wavelength of ~750 nm and a peak power density of ~1 kW/mm². The output was monitored with a fibre placed near the wafer edge and directed to a monochrometer, where spectra were observed in real time using a diode array.

Figure 6:
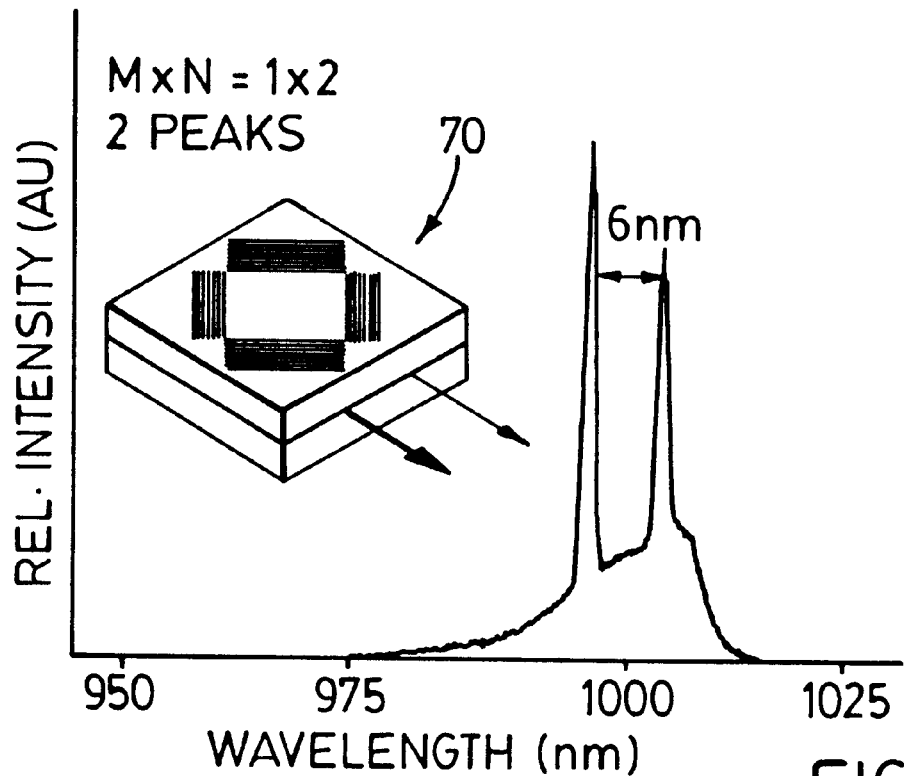
FIG. 6 is a plot of relative intensity versus wavelength for a self-collimated multi-wavelength laser device with an 1×2 grating exhibiting two output peaks for the self-collimating MWL device shown in perspective beside the spectra.
Figure 7:
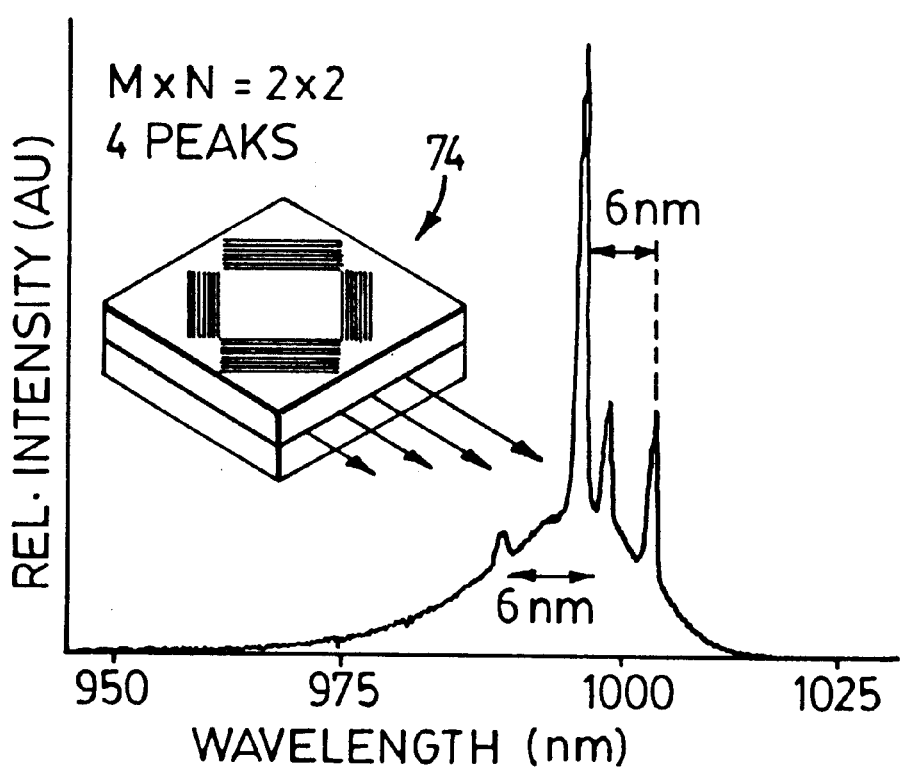
FIG. 7 is a plot of relative intensity versus wavelength for a self-collimated multi-wavelength laser device with an 2×2 grating exhibiting four output peaks for the device shown in perspective beside the spectra.

The spectra of two different devices 70 and 74 are also shown in FIGS. 6 and 7. The expected number of peaks are observed, and with the expected spacing. The large amplified spontaneous emission (ASE) background is an expected consequence of optically pumping material outside the cavity region and the peak widths correspond to resolution of the diode may detector. The shift to longer wavelengths is due to heating.

The angled-grating laser, shown at 80 in FIG. 4(c), comprises a single pair of SGs angled relative to parallel facets 82 and 84, which emulate M superimposed single-pitch gratings. Incident angle θ is determined by the resonance requirement of normal facet reflection, which in conjunction with optical gain produces M collinear collimated wavelengths. For the laser 80 in FIG. 4(c), θ is constrained to a value of (90°−α) by the resonance requirement of normal incidence on the reflective facets. The result is M co-propagating output wavelengths, each of which is determined independently by the diffraction peaks of SG-A.

In respect of the flexibility in selecting resonances, the number of degrees of freedom is M+N, which for one or both of M, N>2 (including the case where one of N or M can be 1 and the other is ≧2) will be less than the number of wavelengths: one will therefore generally not be able to select each resonant wavelength independently. There is, however, a simple design rule which produces a nearly-linear spacing of resonant wavelengths, provided that the total span of wavelengths Δλ is small compared to λ; this is a common configuration for optical communication systems. Setting M=N, a quasi-linear comb of wavelengths can result when the central resonance angle $\theta_0$ satisfies:

$$\tan \theta_0 = sqrt(M) \quad [3]$$

Central values for $\Lambda_m$ and $\Lambda_n$ can be determined from the desired central resonance wavelength $\lambda_0$ using [1] and [2] with $\theta=\theta_0$. Remaining values for $\Lambda_m$ and $\Lambda_n$, selected to give the desired resonant wavelength spacing, can then be obtained through a variety of optimization procedures.

An important consequence for both designs is that the supergratings tightly define both resonant wavelength and the corresponding incident angle, which serves to yield collimated beams with divergence approaching the diffraction limit, given by:

$$\theta_d = (2/\pi)\lambda/D \text{ radians} \quad [4]$$

In addition, any drift in cavity characteristics (e.g. temperature, refractive index) will serve to shift the entire output spectrum as a whole, automatically preventing any cross-channel cross-talk: wavelength spacing is thus self-maintained The difference in the present self-collimated MWL and prior art designs is that the implementations disclosed herein make use of superimposed gratings, producing simultaneous lasing at multiple wavelengths with self-maintained spacing. In particular, the ring cavity design, which consists of supergratings with M and N diffraction curves respectively, would yield M×N resonant wavelengths, This square-law dependence is unique in grating-based MWLs, in contrast to the normally linear relation, and is otherwise infeasible to implement in semiconductors without the BSG scheme. A less obvious out important benefit of this square-law dependence is that the relative spacing of resonant wavelengths is denser than that of the BSG pitches (corresponding to the relative vertical separation of individual curves), this effect is enhanced as the number of channels is increased. The present multiwavelength lasers disclosed herein therefore allow easier implementation of dense channel spacing than conventional MWLs, for which increased density directly affects required fabrication precision.

The present invention provides the first single-device multiple wavelength laser with self-maintained wavelength spacing(s) and high-power diffraction-limited output beams. In addition, it represents the first use of binary supergratings (BSGs), which enable multiwavelength operation, channel spacing integrity, and compact design. BSGs, while similar in fabrication to conventional Bragg grating structures, offer the important difference that the entire grating region contributes distributively to all diffraction spectrum peaks, in contrast to the discretized "piece-wise" nature of cascaded or sampling approaches. For given grating strength and Index step, this decreases grating length by a factor of sqrt(n) for n wavelengths, making it the only practical option in the presence of finite loss.

Figure 11:
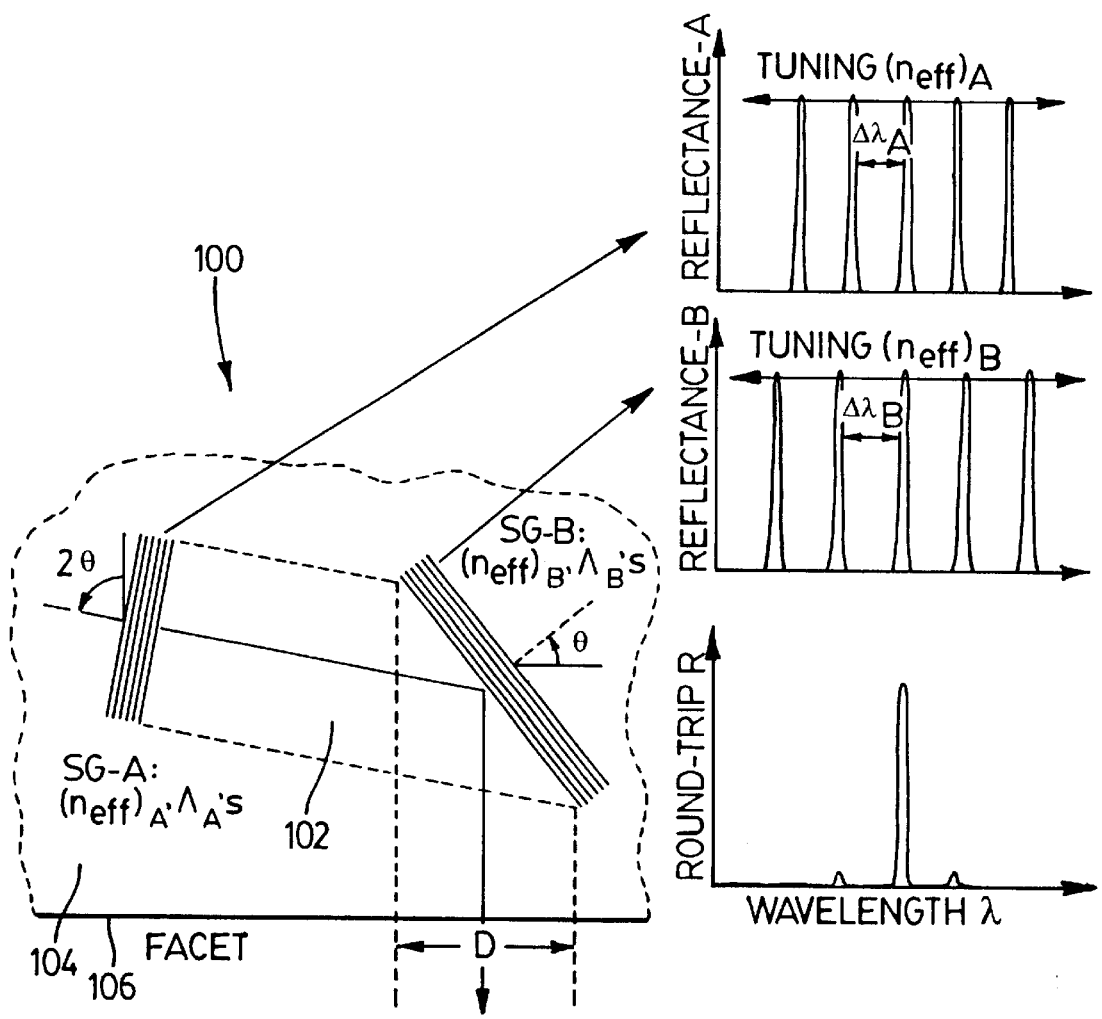
FIG. 11 shows a self-collimated, widely-tunable laser using two BSGs with the reflectance spectra for each of the BSG being shown in the top two insets and the resonance wavelength shown in the bottom inset.

The principle underlying the aforementioned devices can be extended to a laser whose output wavelength can be tuned quasicontinuously over a broad range. Such a laser device is shown generally at 100 in FIG. 11. A resonant cavity 102 is defined in a planar gain medium 104 defined by a reflective facet 106 and two superimposed gratings, SG-A and SG-B, oriented as shown at effective angles with respect to the facet 106 and to each other. In principle, θ can value greater than 0° and less than 90°, although practically speaking the range 30°<θ<60° is preferred. SG-A emulates the superposition of the set of pitches $\Lambda_A$, and SG-B emulates the set of pitches $\Lambda_B$. For the geometry shown, the wavelengths diffracted by each grating are therefore:

$$\lambda_A = 2 (n_{eff})_A \Lambda_A$$

$$\lambda_B = 2 (n_{eff})_B \Lambda_B \sin(\theta)$$

While both sets of diffraction wavelengths are chosen to lie within the gain spectrum, they are also chosen such that the condition $\lambda_A = \lambda_B$ is satisfied for at most one wavelength for a given tuning configuration.

The effective refractive indices in the region of SG-A and SG-B, $(n_{eff})_A$ and $(n_{eff})_B$ respectively, can be tuned independently, by a variety of established and proven techniques such as current- and electric-field tuning. This permits independent shifting of the diffraction spectra of SG-A and SG-B, thereby enabling wide-range tuning of the resonant wavelength. When the diffraction spectra of SG-A and SG-B share a common peak wavelength, this wavelength will be resonant. This resonant wavelength can be varied continuously (typically over a range of 5–10 nm) by tuning $(n_{eff})_A$ and $(n_{eff})_B$ such that the common peak of SG-A and SG-B remains aligned.

If $(n_{eff})_A$ and $(n_{eff})_B$ are tuned to produce a relative shift between the diffraction spectra, the diffraction wavelength common to SG-A and SG-B can "hop" from one peak to the next, allowing continuous tuning in a different part of the gain spectrum. This approach produces a set of regions of continuous tuning, whose ranges can be made to overlap slightly in order to completely cover a tuning range of the order of 100 nm. Because tuning; is continuous only in local ranges of ~10 nm (i.e. piece-wise continuous), this tuning mechanism is said to be quasi-continuous.

This tuning arrangement is known as Vernier tuning, which has been used successfully in the context of conventional DFB and DBR lasers (NTT reference), where propagation is quasi-one-dimensional in nature—see H. Ishii, H. Tanobe, F. Kano, Y. Tohmori. Y. Kondo, and Y. Yoshikuni, "Quasicontinuous wavelength tuning in super-structure-grating (SSG) DBR lasers", *IEEE J. Quantum Electon.* 32 433441 (1996).

The advantages and novelty of this device stem from its exploitation of two-dimensional propagation, which results In output which is self-collimated and, owing to the broad device area, can be much higher in power (hundreds of mW). In contrast, existing widely tunable semiconductor lasers have highly divergent output and much lower maximum power.

The wavelength spacings $\Delta\lambda_A$ and $\Delta\lambda_B$ in the reflectance curves for SG-A and SG-B need not be constant. Design rules for selecting appropriate wavelength spacings are well-documented in the literature—see Ivan A. Avrutsky, Dave S. Ellis, Alex Tager, Hanan Anis, and Jimmy M. Xu, "Design of Widely Tunable Semiconductor Lasers and the Concept of Binary Superimposed Gratings (BSG's)", *IEEE J. Quant. Electron.* 34 729–741.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

TABLE 1

Performance Summary of Prior Art MWL Devices

| Design type | Year/ Ref. # | # Chan. | Δλ (nm) | Power/ channel | I(mA)/ channel | Near-field beam size | Comments |
|---|---|---|---|---|---|---|---|
| DFB LASER ARRAY | 1996/1 | 8 | 2 | −13 d/Bm | 25 | 3 μm | Redundancy: 2 Lasers/wavelength |
| VCSEL | 1996/2 | large | span: 62.7 nm | 0.8 mW | 22 | | Uneven λ spacing |
| Waveguide grating | 1996/3 | 18 | 0.8 | −14 dBm | 40 | 1 μm | Missing Channels |
| Phase Array | 1996/4 | 9 | 3.2 | 0.2 mW | 101 | 2.5 μm | Mode-hopping Li kinks |

Therefore what is claimed is:

1. A self-collimating multiwavelength laser, comprising:

a gain medium;

at lest two superimposed gratings formed in said gain medium, said at least two superimposed gratings being oriented at an effective angle to each other to define a resonance cavity for producing self-collimating multi-wavelength lasing; and means for pumping said gain medium to produce a population inversion in said gain medium.

2. The laser according to claim 1 wherein said gain medium is a substantially planar gain medium and said superimposed gratings are binary superimposed gratings.

3. The laser according to claim 2 wherein said binary superimposed gratings include an integral number of single-pitch gratings.

4. The laser according to claim 2 wherein one of said binary superimposed gratings has N single-pitch gratings and another of said binary superimposed gratings has M single-pitch gratings, wherein when one of M or $N \geq 1$, the other is $\geq 2$.

5. The laser according to claim 4 wherein said at least two binary superimposed gratings include at least two pairs of binary superimposed gratings defining said resonance cavity, and wherein a laser output of said resonance cavity comprises M×N wavelength peaks.

6. The laser according to claim 5 wherein said at least two pairs of binary superimposed gratings are oriented with respect to each other to define a substantially rectangular resonance cavity.

7. The laser according to claim 4 wherein said planar gain medium includes a pair of spaced reflective facets oriented with respect to said at least two spaced binary gratings to define said resonance cavity, and wherein a laser output of said resonance cavity comprises M×N wavelength peaks.

8. The laser according to claim 7 wherein said at least two spaced binary superimposed gratings and pair of spaced reflective facets are oriented with respect to each other to define a substantially rectangular resonance cavity.

9. laser according to claim 4 wherein the planar gain medium includes a pair of spaced reflective facets, and wherein said two spaced binary superimposed gratings each of which emulate $M \geq 22$ superimposed single-pitch gratings, wherein the pair of reflective facets and the two binary superimposed gratings are oriented with respect to said reflective facets at an effective angle to produce a laser output of said resonance cavity comprising M wavelength peaks.

10. The laser according to claim 4 wherein said planar gain medium is selected from the group consisting of doped glasses and semiconductors.

11. The laser according to claim 10 wherein said planar gain medium includes an AlGaAs planar waveguide with said binary superimposed grating being formed in an upper cladding of the waveguide.

12. The laser according to claim 4 wherein said means for pumping said planar gain medium is selected from the group consisting of optical pumping and electrical pumping and combinations thereof.

13. A tunable laser, comprising;

a gain medium;

at least two superimposed gratings formed in said gain medium, said at least two superimposed gratings being oriented at an effective angle to each other to define a resonance cavity;

tuning means for independently tuning each of said at least two superimposed gratings to independently adjust an effective refractive index of each of said at least two superimposed grating thereby shifting diffraction spectra of the superimposed gratings for tuning of a resonant wavelength in said resonance cavity; and means for pumping said gain medium to produce a population inversion in said gain medium.

14. The laser according to claim 13 wherein said gain medium is a substantially planar gain medium and said superimposed gratings are binary superimposed gratings.

15. The laser according to claim 13 wherein said gain medium includes at least one reflective facet, and wherein said at least two superimposed gratings and said at least one facet are oriented with respect to each other to define said resonance cavity.

16. The laser according to claim 13 wherein the tuning means includes application of electric fields and electric currents to said gratings.

17. A method of producing a self-collimating multiwavelenth laser, comprising:

providing a gain medium and producing therein at least two superimposed gratings, said at least two superimposed gratings being oriented at an effective angle to each other to define a resonance cavity for producing self-collimating multiwavelength lasing; and pumping said gain medium to produce a population inversion in said gain medium.

18. The method according to claim 17 wherein the gain medium is a substantially planar gain medium and said superimposed gratings are binary superimposed gratings.

19. The method according to claim 18 wherein said gain medium includes at least one reflective facet, and wherein said at least two superimposed gratings and said at least one facet are oriented with respect to each other at angle effective to define said resonance cavity.

20. The method according to claim 18 wherein said binary superimposed gratings include an integral number of single-pitch gratings.

21. A method of tuning a self-collimated laser, comprising:

providing a gain medium and producing therein at least two superimposed gratings, said at least two superimposed gratings being oriented at an effective angle $\theta$ to each other to define a resonance cavity, wherein a first of said two superimposed gratings emulates a superposition of the set of pitches $\Lambda_A$ and has an effective refractive index in a region of said first grating of $(n_{eff})_A$ and the second superimposed grating emulates the set of pitches $\Lambda_B$, and has an effective refractive index in a region of said second grating of $(n_{eff})_B$, wherein a set of wavelengths diffracted by said first grating is $\lambda_A = 2 (n_{eff})_A$ and a set of wavelengths diffracted by said second grating is $\lambda_B 2 (n_{eff})_B \Lambda_B \sin(\theta)$;

adjusting an effective refractive index of at least one of said superimposed gratings to achieve a resonance condition in which $\lambda_A = \lambda_B$; and pumping said gain medium to produce a population inversion in said gain medium.

22. The method according to claim 21 wherein both sets of diffraction wavelengths are chosen to lie within a gain spectrum of said planar waveguide.

23. The method according to claim 21 wherein $0° < \theta < 90°$.

24. The method according to claim 23 wherein $30° < \theta < 60°$.

25. The method according to claim 21 wherein the refractive index of both gratings is adjusted to achieve the resonance wavelength.

26. The method according to claim 25 wherein $(n_{eff})_A$ and $(n_{eff})_B$ are adjusted by application of electric fields or electric currents to said first and second gratings.

* * * * *